INVENTOR
William C. McWhirter:
BY
HIS ATTORNEY

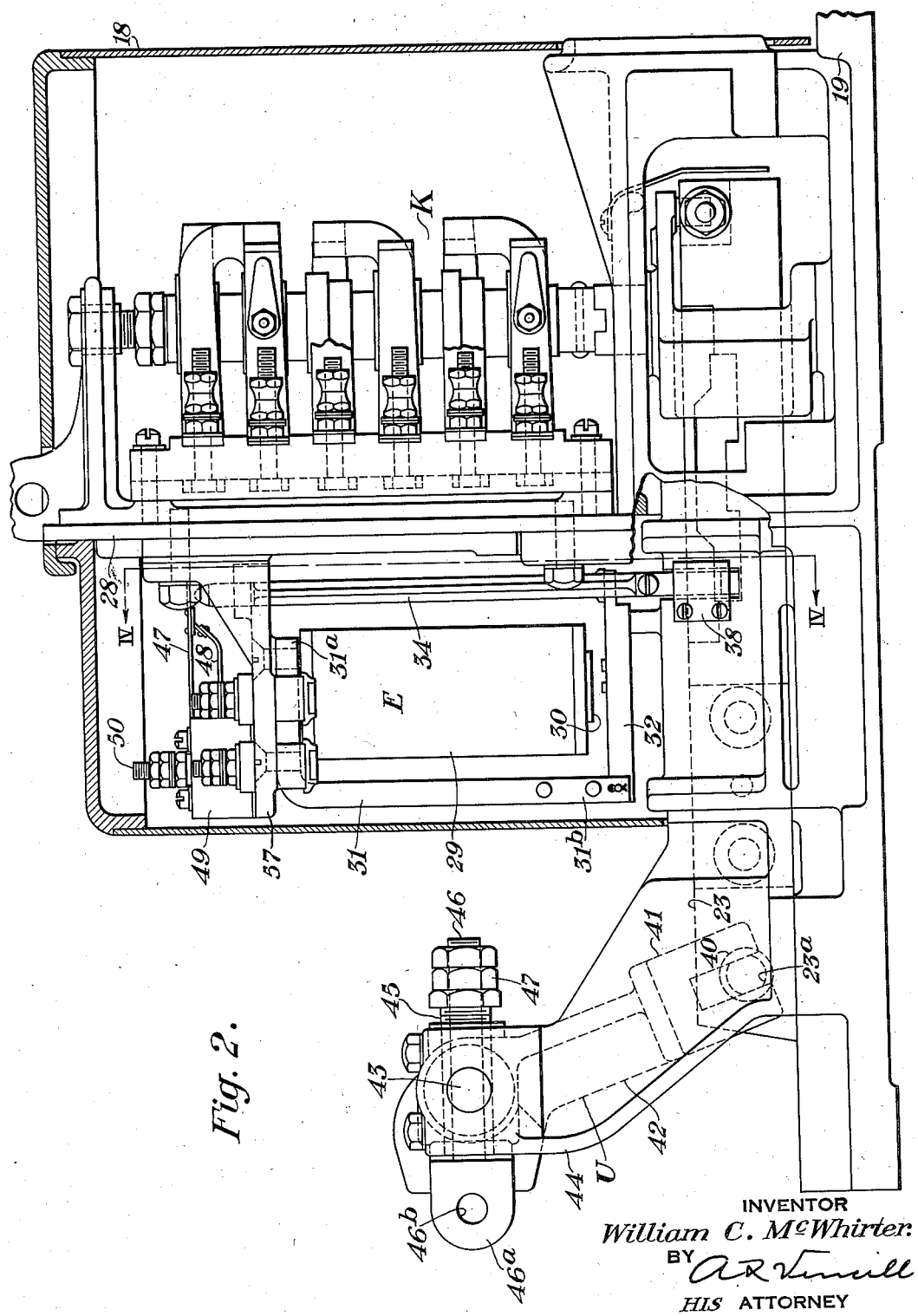

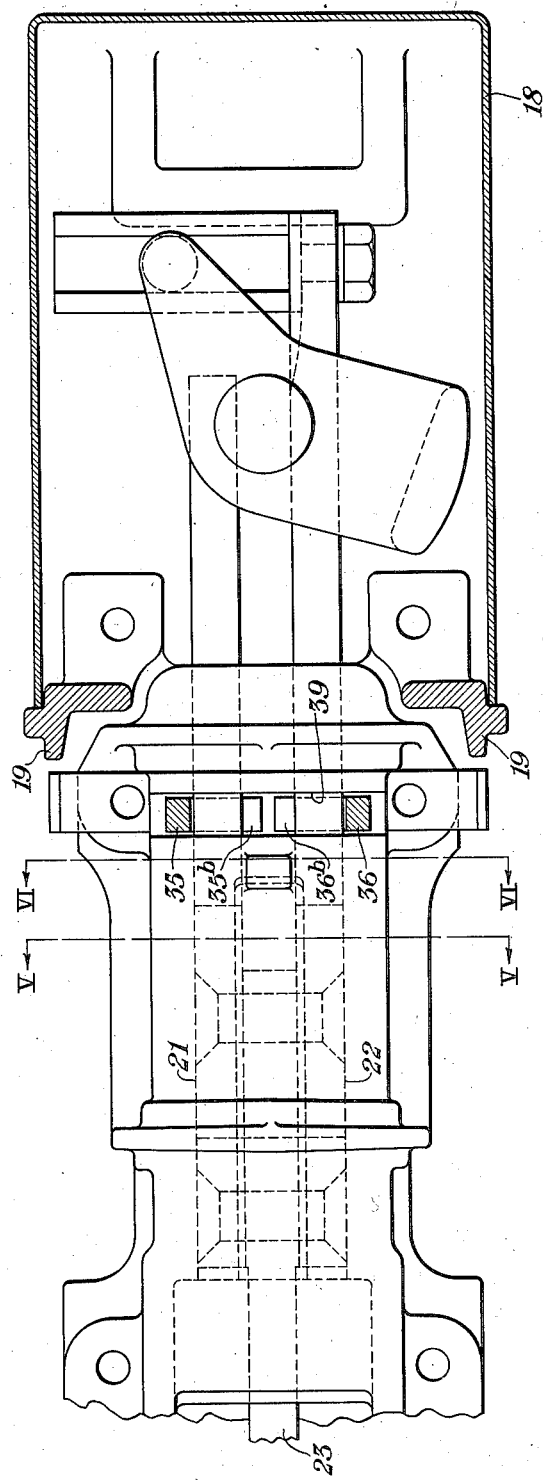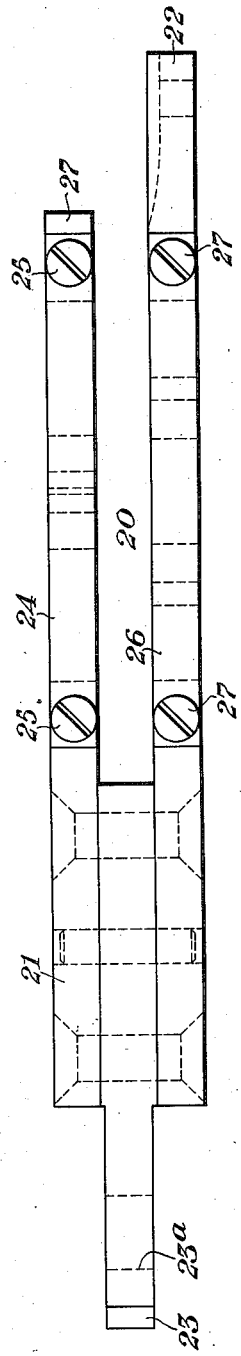

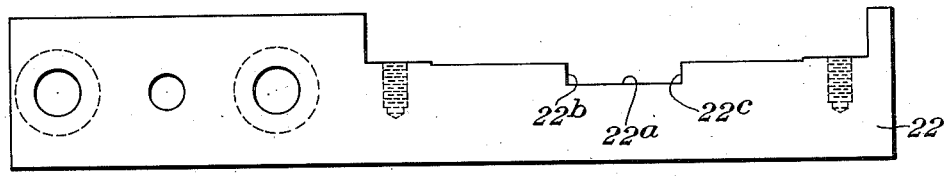
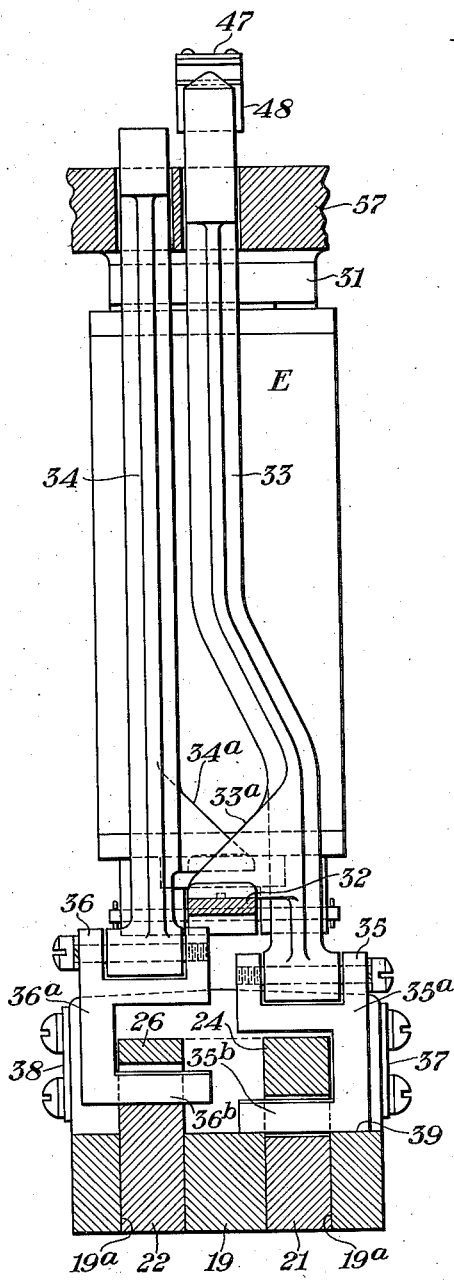
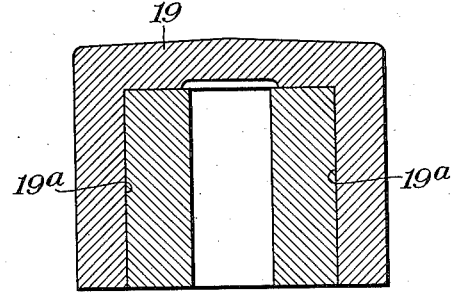
Fig. 5.
Fig. 6.
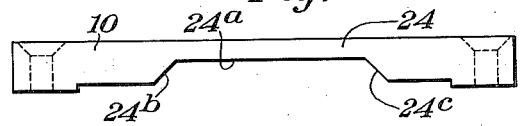
Fig. 10.
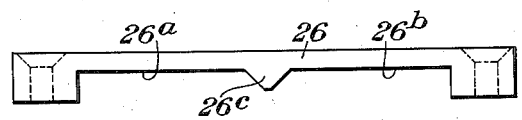
Fig. 11.
Fig. 4.
INVENTOR
William C. McWhirter.
BY
HIS ATTORNEY Aug. 25, 1936.   W. C. McWHIRTER   2,052,414
ELECTRIC LOCK FOR INTERLOCKING MACHINE LEVERS
Filed Oct. 26, 1935   5 Sheets-Sheet 5

Patented Aug. 25, 1936

2,052,414

UNITED STATES PATENT OFFICE 2,052,414

ELECTRIC LOCK FOR INTERLOCKING MACHINE LEVERS

William C. McWhirter, Wilkinsburg, Pa., assignor to The Union Switch & Signal Company, Swissvale, Pa., a corporation of Pennsylvania Application October 26, 1935, Serial No. 46,915

9 Claims. (Cl. 246—146)

My invention relates to electric locks for interlocking machine levers, and particularly to locks which are adapted to be operatively connected with the lever latch for the purpose of restricting the movement of the lever latch under certain conditions.

More particularly, my invention relates to improvements in electric locks of the type described and claimed in Letters Patent of the United States No. 1,741,003, granted to I. W. Vensel and W. E. Smith on Dec. 24, 1929.

I will describe one form of electric lock embodying my invention, and will then point out the novel features thereof in claims.

Figure 1:
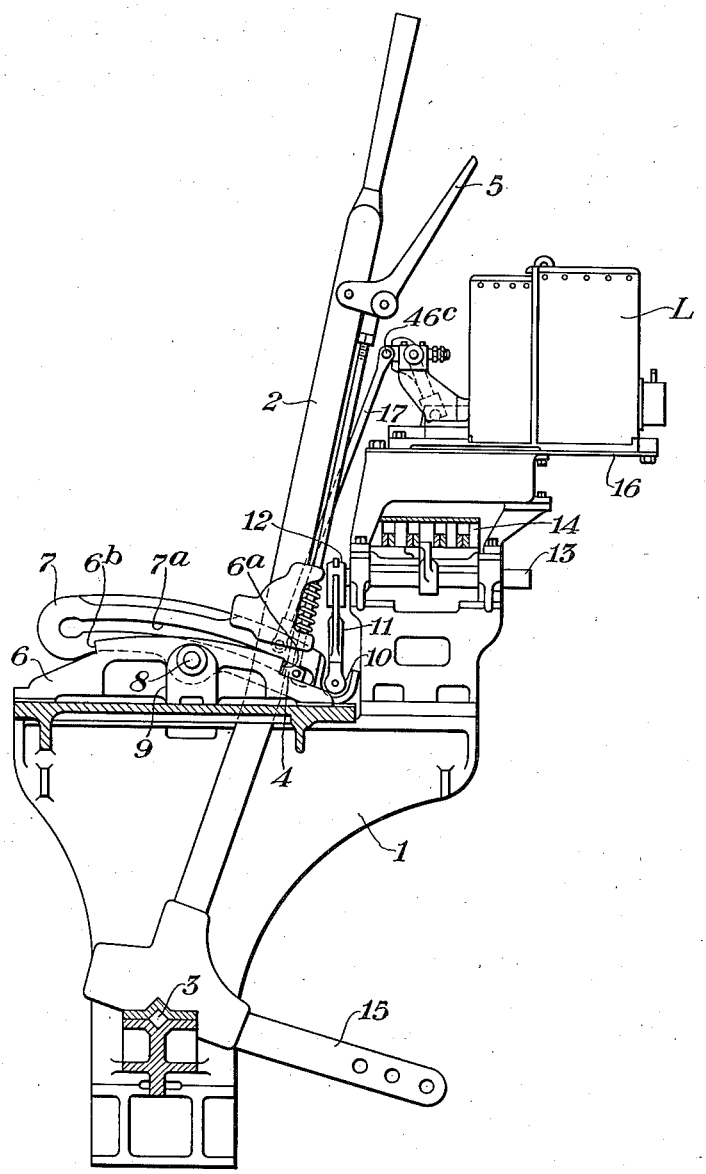
Figure 9:
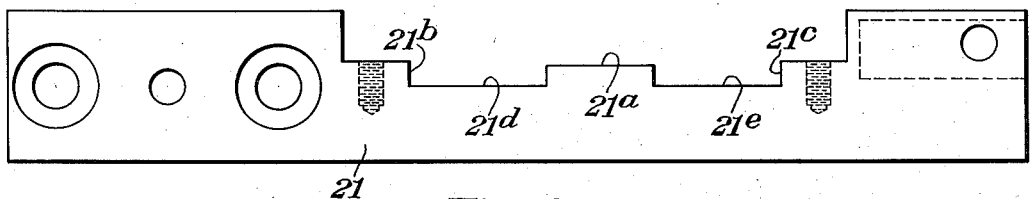

In the accompanying drawings, Fig. 1 is an end view partly in section and partly in elevation showing an interlocking machine lever provided with an electric lock embodying my invention. Fig. 2 is a view partly in section and partly in side elevation showing, on an enlarged scale, the electric lock illustrated in Fig. 1, the cover and certain of the parts being removed to better illustrate the construction. Fig. 3 is a top plan view, with certain of the parts removed, of the lock shown in Fig. 2. Fig. 4 is a sectional view taken substantially on the line IV—IV of Fig. 2. Figs. 5 and 6 are sectional views taken on the lines V—V and VI—VI, respectively, of Fig. 3. Fig. 7 is a top plan view of the lock bar assembly 20 forming part of the lock illustrated in Figs. 2, 3 and 4. Fig. 8 is a detail view of the lock bar 22 forming part of the lock bar assembly shown in Fig. 7. Fig. 9 is a detail view of the lock bar 21 forming part of the lock bar assembly 20 shown in Fig. 7. Figs. 10 and 11 are detail views of the depressor plates 24 and 26, respectively, forming part of the lock bar assembly 20. Figs. 12, 14, 16, 18 and 20 are detail views showing the lock bar 21 and locking yoke 35 in the different relative positions which these parts assume during movement of the lever 2 from its fully locked normal position to its fully locked reverse position. Figs. 13, 15, 17, 19 and 21 are detail views showing the lock bar 22 and locking yoke 36 in the different relative positions these parts assume during movement of the lever 2 from its fully locked normal position to its fully locked reverse position.

Similar reference characters refer to similar parts in each of the several views.

Referring first to Fig. 1, the reference character 1 designates the framework of a mechanical interlocking machine of the well-known Saxby and Farmer variety in which a manually operable lever 2, constructed in accordance with the usual practice, is mounted for oscillation around a horizontal axis, indicated at 3 in the drawings. The lever 2 is provided with the usual spring biased latch 4 operated by a handle 5, which latch cooperates with two shoulders 6a and 6b formed on a quadrant 6 to retain the lever in its two extreme positions. The latch 4 also cooperates with a slot 7a formed in a rocker link 7 which is pivotally supported near its center by means of a pivot pin 8 mounted in a bracket 9 secured to the framework 1. One end of the rocker link 7 is connected through a universal joint 10 and a link 11 with a crank 12 which is secured to one end of a shaft 13, whereby oscillation of the rocker link will cause corresponding oscillation of the shaft 13. The shaft 13 actuates the usual mechanical interlocking mechanism indicated at 14 in the drawings, for securing the proper cooperation between the lever 2 and the other levers of the interlocking machine. Rigidly fastened to the lower end of the lever 2 is the usual tail piece 15 which is adapted to be connected by a suitable pipe line, cable or the like (not shown) to the device which it is desired to operate by the lever, such for example as a signal, switch, switch and lock movement, facing point lock or the like.

The operation of the portion of the apparatus thus far described is well-known, and it is believed, therefore, that for purposes of my present invention, the following brief description of this operation will be sufficient: As shown in the drawings, the lever 2 occupies its normal position, and is latched in this position by engagement of the latch 4 with the shoulder 6a. When it is desired to reverse the lever 2, the operator first operates the latch handle 5 to raise the latch 4 to a position in which it is clear of the shoulder 6a. This movement of the latch rotates the rocker link 7 in a counter-clockwise direction through approximately one-half of its total stroke, and the rotation of the rocker link, in turn, actuates the mechanical interlocking mechanism through the medium of the link 11 and crank 12 to effect the primary locking of all conflicting levers in a well-known manner. The operator may then throw the lever 2 to its reverse position. During this movement of the lever 2 to its reverse position, the latch 4 will move along the slot 7a in the rocker link 7, but no further movement of the rocker link will take place until the lever reaches its full reverse position and the latch 4 is released, because the radius of curvature of the slot 7a in the rocker link is the same as the radius of curvature of the upper end of the quadrant 6. However, when the lever reaches its full reverse position and the latch is released, the latch will drop back of the shoulder 6ᵇ due to its bias, and this movement of the latch will cause the rocker link to rotate in the same direction, and through approximately the same distance, as this link was rotated when the latch was raised to clear the shoulder 6ᵃ. This latter movement of the rocker link will again actuate the mechanical interlocking mechanism to effect a final locking of this mechanism.

During movement of the lever 2 from its reverse position to its normal position, the operation of the various parts is exactly the reverse of that just described, and will be understood from the foregoing and from an inspection of the drawings without further description.

The electric lock embodying my present invention, which lock is designated as a whole by the reference character L, is adapted to impose on the movement of the lever latch certain restrictions which will be made clear hereinafter, and the lock may be secured to the interlocking machine in any desired position and may be connected with the rocker link 7 in any convenient manner. In the particular arrangement illustrated in Fig. 1, this lock is mounted on a suitable platform 16 which is bolted to the framework 1 above the interlocking mechanism 14, and is operatively connected with the right-hand end of the rocker link 7 by means of a vertical connecting rod 17.

Figures 12, 13:
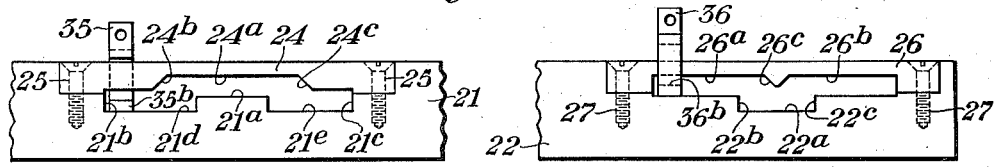
Figures 14, 15:
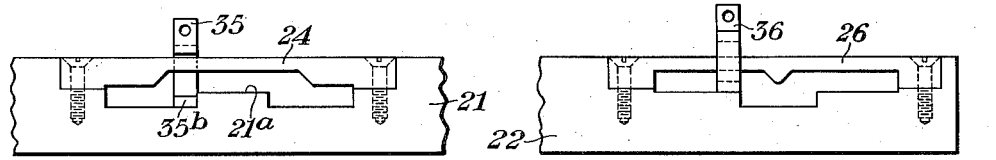

Referring now also to Figs. 2, 3 and 4, the lock L comprises, in general, a removable cover 18 secured to a frame 19 which supports the entire mechanism. The frame 19 is provided with guides 19ᵃ (see Figs. 4, 5 and 6) which guides slidably receive a longitudinally movable lock bar assembly 20 (see Fig. 7) comprising two lock bars 21 and 22 secured to one end of a driving bar 23. As best seen in Fig. 9, the lock bar 21 has a portion of its upper side cut away, and is provided at the bottom of this cut-away portion with a locking dog 21ᵃ which is spaced from two shoulders 21ᵇ and 21ᶜ by means of recesses 21ᵈ and 21ᵉ, respectively. A depressor plate 24 (see Figs. 7 and 10) is secured to the lock bar 21 within the cut-away portion by means of screws 25, and is provided on its under surface with a recess 24ᵃ having inclined ends 24ᵇ and 24ᶜ. The recess 24ᵃ is disposed directly above the dog 21ᵃ on the bar 21 as shown in Fig. 12, and is made somewhat longer than the dog 21ᵃ for a purpose which will be made clear presently.

The lock bar 22 also has a portion of its upper side adjacent its right-hand end cut away, and is provided at the bottom of this cut-away portion with a recess 22ᵃ the sides of which form shoulders 22ᵇ and 22ᶜ, as shown in Fig. 8. A depressor plate 26 (shown in Figs. 7 and 11) is secured to this latter lock bar within the cut-away portion (see Fig. 13) by means of screws 27, and is provided in its under surface with two recesses 26ᵃ and 26ᵇ separated by a depressor wedge 26ᶜ which is disposed directly above the central portion of the recess 22ᵃ in the bar 22.

A bracket 57 is bolted to a vertically projecting arm 28 forming part of the frame 19, and this bracket supports an electromagnet E which, in the form here shown, comprises, an operating winding 29 mounted on a vertically disposed magnetizable core 30, the upper end of which is secured to the horizontally disposed short leg 31ᵃ of an L-shaped magnetizable backstrap 31. The long leg 31ᵇ of the backstrap 31 extends parallel to the core 30, and has pivotally attached to its lower end a magnetizable armature 32 which cooperates with the core 30 in the usual and well-known manner. The free end of the armature 32 projects between two vertically disposed yoke operating rods 33 and 34 (see Fig. 4), the upper ends of which are slidably mounted in suitable guides formed in the bracket 57, and the lower ends of which are pivotally attached to two locking yokes 35 and 36, respectively. The locking yokes are mounted for vertical sliding movement in a transverse slot 39 formed in the frame 19, and are held in the proper longitudinal positions within the slot 39 by means of plates 37 and 38 which are secured to the frame 19 at the opposite ends of the slot 39. The locking yoke 35 is provided with an L-shaped lower portion 35ᵃ, the horizontal leg 35ᵇ of which lies within the irregular slot formed between the lock bar 21 and the depressor plate 24, and the locking yoke 36 is likewise provided with an L-shaped lower portion 36ᵃ, the horizontal leg 36ᵇ of which lies within the irregular slot formed between the lock bar 22 and the depressor plate 26. The yoke operating rod 33 is provided with a laterally projecting lug 33ᵃ which overlies the armature 32 and cooperates therewith in such manner that by energizing the electromagnet E, locking yoke 35 may at times be lifted from a locking position in which the horizontal leg 35ᵇ thereof is within one or the other of the recesses 21ᵈ or 21ᵉ in the lock bar 21 to an unlocking position in which the horizontal leg 35ᵇ is withdrawn from these recesses and is clear of the locking dog 21ᵃ; and the rod 34 is similarly provided with a laterally projecting lug 34ᵃ which also overlies the armature 32, and which cooperates therewith in such manner that by energizing the electromagnet E the locking yoke 36 may at times be lifted from a locking position in which the horizontal leg 36ᵇ is disposed within the recess 22ᵃ to an unlocking position in which the leg 36ᵇ is withdrawn from the recesses 22ᵃ and is clear of the shoulders 22ᵇ and 22ᶜ.

The left-hand end of the driving bar 23 is provided with a hole 23ᵃ to receive a pin 40 which cooperates with the bifurcated end 41 of an operating crank 42. This crank is pivotally mounted at 43 in an arm 44 which projects upwardly from the frame 19, and the upper end of this crank is bored and threaded to receive an adjusting sleeve 45. This adjusting sleeve 45 is provided with a longitudinal bore which receives the shank of a crank arm 46, the head 46ᵃ of which is provided with a hole 46ᵇ which receives a pin 46ᶜ (see Fig. 1) for pivotally connecting the crank with the vertical connecting rod 17. It will be seen that by screwing the adjusting sleeve 45 to the desired position and then fastening the crank arm 46 in place in the adjusting sleeve by means of lock nuts 47, the effective length of the crank arm 46 with respect to the center of oscillation of the crank 42 may be made any desired amount. The rocker links of an interlocking machine do not all have exactly the same amount of throw, whereas the length of the stroke of the lock bar assembly is fixed, and the purpose of the structure just described is to permit adjusting of the lock to the throw of the particular rocker to which the lock is applied.

Figures 16, 17:
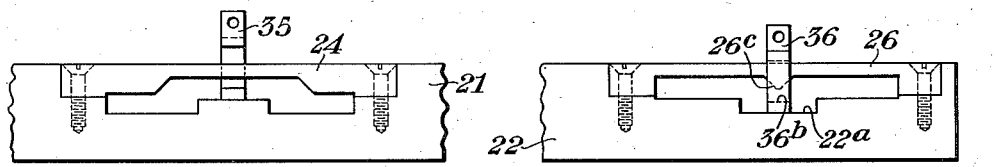
Figures 18, 19:
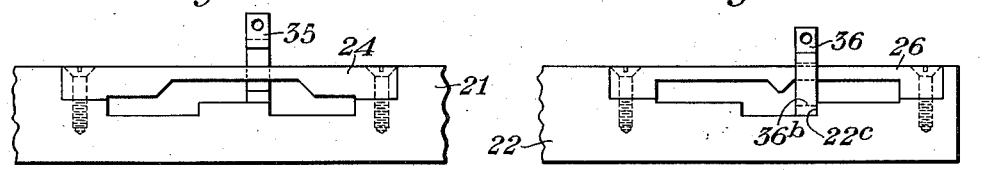
Figures 20, 21:
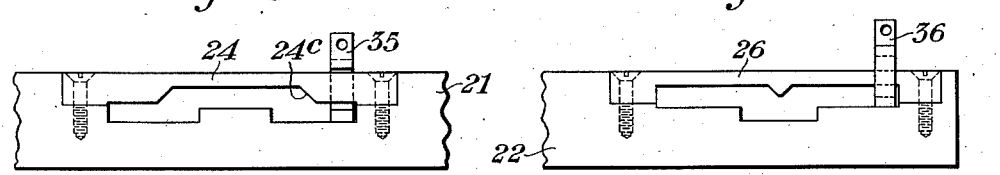

The operation, as a whole, of the portion of the apparatus thus far described is as follows: When the lever 2 occupies its normal position, and the lever latch 4 occupies its spring biased or latching position in which it is shown in Fig. 1, the lock bar assembly 20 occupies its extreme right-hand position in which it is shown in Fig. 2; the magnet E is deenergized; the locking yoke 35 occupies the relative position with respect to the lock bar 21 in which the horizontal leg 35<sup>b</sup> thereof is disposed within the left-hand end of the recess 21<sup>d</sup> in the bar 21, as shown in Fig. 12, and the locking yoke 36 occupies the relative position with respect to the lock bar 22 in which the horizontal leg 36<sup>b</sup> of the yoke 36 is disposed within the left-hand end of the recess 26<sup>a</sup> in the depressor plate 26, as shown in Fig. 13. If, now, with the parts in the positions just described, the operator operates the latch handle 5 to raise the latch 4 in order to reverse the lever 2, the resultant movement of the latch 4 will act through the rocker link 7, vertical connecting rod 17, and operating crank 46 to move the lock bar assembly toward the left, and the parts are so proportioned that, under these conditions, when the latch has been raised approximately one-half of its total stroke, the lock bar assembly 20 will be moved toward the left to a position in which the left-hand side of the locking dog 21<sup>a</sup> on the lock bar 21 will engage the horizontal leg 35<sup>b</sup> of the locking yoke, these relative positions of the lock bar 21 and locking dog 21<sup>a</sup> being shown in Fig. 14, and the corresponding relative positions of the lock bar 22 and the locking yoke 36 being shown in Fig. 15. It is obvious, therefore, that the operator will be prevented from raising the latch 4 more than one-half of its total travel unless the electromagnet E becomes energized and raises the yoke 35 to its unlocking position in which the leg 35<sup>b</sup> of the yoke is clear of the dog 21<sup>a</sup>. The necessary energization of the electromagnet E will normally be effected automatically under these conditions by virtue of control circuits not shown if conditions are safe for lever 2 to be thrown to its reverse position. It should be noted that, when electromagnet E becomes energized under these conditions, locking yoke 36 will be held in its raised or unlocking position by the lock bar 22 in the manner shown in Fig. 15, so that it is only necessary for the electromagnet to lift the yoke 35. Assuming that electromagnet E becomes energized and raises the yoke 35 in the proper manner, the operator may then complete the balance of the movement of the latch to its unlatching position, and when the latch has been moved to its full unlatching position, the lock bar 21 will then be moved toward the left to the relative positions with respect to the yoke 35 in which it is shown in Fig. 16, while the lock bar 22 will then be moved toward the left to the relative position with respect to the yoke 36 in which it is shown in Fig. 17. As the lock bar 22 moves toward the left to the relative position with respect to the yoke 36 in which it is shown in Fig. 17, the depressor wedge 26<sup>c</sup> will cooperate with the leg 36<sup>b</sup> of the locking yoke 36 to force the yoke to its lower or locking position in which the leg 36<sup>b</sup> is disposed in the recess 22<sup>a</sup>. During this movement of the yoke 36 to its locking position, the electromagnet E will be deenergized by virtue of its control circuits, and it follows therefore that the magnet will not oppose the movement of the yoke. As the lever 2 is moved from its normal position to its reverse position, no further movement of the locking bar assembly or yokes 35 and 36 will take place, and these parts will remain in the relative positions in which they are shown in Figs. 16 and 17. When, however, the lever 2 reaches its full reverse position and the latch 4 is released, the resultant movement of the rocker link which then takes place due to the bias of the spring associated with the latch will cause additional movement of the lock bar assembly toward the left, and the parts are so proportioned that under these conditions, the movement of the latch through approximately one-half of its total downward travel will move the lock bar assembly to the position in which the shoulder 22<sup>c</sup> of the lock bar 22 will engage the leg 36<sup>b</sup> of the yoke 36 unless the electromagnet E is again energized, these latter relative positions of the yoke 36 and lock bar 22 being shown in Fig. 19. If, however, the electromagnet E is energized at the proper time, which energization will usually take place automatically unless some condition exists which would make it dangerous for the latch to complete its movement, the yoke 36 will be raised from its locking position to its unlocking position and the lock bar will then be free to complete its movement toward the left, thus permitting the lever latch 4 to move to its lowermost position due to its bias. When the lock bar 22 and locking yoke 36 occupy the relative positions in which they are shown in Fig. 19, the lock bar 21 and yoke 35 occupy the relative positions in which they are shown in Fig. 18, and it will be seen, therefore, that when electromagnet E becomes energized to move the yoke 36 from its locking to its unlocking position, the yoke 35 will already be held in its raised position by the lock bar 21 so that the electromagnet E will only have to exert sufficient force to raise the yoke 36. As the latch completes its downward movement, the inclined end 24<sup>c</sup> of the depressor plate 24 will cooperate with the yoke 35 to force this yoke to its lowermost or latching position. During the movement of the yoke 35 to its latching position, electromagnet E will be deenergized by virtue of its control circuits so that this downward movement will be unresisted. When the latch 4 reaches its lowermost position, the lock bar assembly 20 will be moved to the extreme left-hand end of its stroke and, under these conditions, the lock bar 21 and yoke 35 will occupy the relative positions in which they are shown in Fig. 20 and the lock bar 22 and yoke 36 will occupy the relative positions in which they are shown in Fig. 21.

The operation of the apparatus as a whole when the lever 2 is restored to its normal position is similar to that just described and will be understood from the foregoing without further description.

The yoke operating rod 33 may, if desired, be utilized to operate a contact 47—48 in such manner that this contact will be closed when and only when the yoke 35 occupies its lowermost or latching position, and the yoke operating rod 34 may likewise be utilized to operate a similar contact not shown. The contact fingers 47 and 48 which comprise the contact 47—48 are secured to an insulating block 49 mounted on the top of the bracket 27 and are electrically connected with suitable terminal posts, only one of which 50 is visible in the drawings.

The lock L will usually also include a circuit controller K which may be utilized to control the energization of the electromagnet E along with any other device which it is desired to have control the electromagnet. The circuit controller K forms no part of my present invention, and is identical with that shown and described in the previously referred to Vensel and Smith Patent No. 1,741,003. Since the circuit controller K forms no part of my present invention and is similar to that shown and described in the said Vensel and Smith patent, it is believed to be unnecessary to describe this circuit controller herein.

One advantage of a lock of the type embodying my present invention in which two locking bars and two separate locking yokes are employed over similar locks employing a single locking bar is that with locks employing a single locking bar, it is impossible with practical operating strokes to obtain so much free operation of lever latch 4 in its upward as well as its downward stroke before being locked by the lock bar, since the locking points of the lock bar approach or arrive at an overlapping point in the stroke of the bar, thus resulting in an impractical construction. The construction employed in this invention permits a maximum looseness in the mechanical interlocking of the machine and at the same time provides a practical construction by which a lever can be locked in the normal and reverse positions and also in the normal latched-up position and reverse latched-up position. The downward stroke of the latch as described in this invention provides ample stroke for the operation of contacts, as is desirable.

It should be pointed out that while in describing my invention I have referred to a certain proportioning of the parts, this proportioning may be varied as conditions require without departing from the general design and operation of the mechanism as described in the foregoing.

Although I have herein shown and described only one form of apparatus embodying my invention, it is understood that various changes and modifications may be made therein within the scope of the appended claims without departing from the spirit and scope of my invention.

Having thus described my invention, what I claim is:

1. An electric lock for a lever of a mechanical interlocking machine comprising two lock bars adapted for operative connection with the rocker arm of the machine lever, each said lock bar being provided with a cam slot; an electromagnet, and two locking yokes separately controlled by said electromagnet and each having a part cooperating with the cam slot in a different one of said lock bars in such manner that said yokes will at times restrict the movement of said lock bars unless said magnet is energized.

2. An electric lock for a lever of a mechanical interlocking machine comprising two lock bars secured together to move as a unit and adapted for operative connection with the rocker arm of the machine lever, each said lock bar being provided with a cam slot, an electromagnet, and two locking yokes separately controlled by said electromagnet, and each having a part cooperating with the cam slot in a different one of said lock bars in such manner that said yokes will at times restrict the movement of said lock bars unless said magnet is energized.

3. An electric lock for a mechanical interlocking machine lever comprising two separate lock bars operatively connected with the lever latch, an electromagnet, and two locking members separately controlled by said electromagnet and each cooperating with a different one of said bars in such manner that said members will at times restrict the movement of said bars and thereby restrict the movement of said latch unless said electromagnet is energized.

4. The combination with the lever of a mechanical interlocking machine of the type provided with a spring biased latch which cooperates with two shoulders formed on a quadrant to retain the lever in its two extreme positions, of an electric lock comprising a first lock bar operatively connected with said latch, an electromagnet, a first locking member controlled by said electromagnet and cooperating with said first lock bar in such manner that said locking member will engage said lock bar and prevent movement of said latch to a position to clear said shoulders unless said electromagnet is energized, a second locking bar operatively connected with said latch, and a second locking member controlled by said electromagnet and cooperating with said second locking bar in such manner that said locking bar will engage said locking member and prevent said latch from returning to its full spring biased position after it has been moved to a position to clear one or the other of said shoulders unless said electromagnet is energized.

5. The combination with the lever of a mechanical interlocking machine of the type provided with a spring biased latch movable between a latching position and an unlatching position for latching the lever in two extreme positions, of an electric lock comprising a first and a second lock bar operatively connected with said latch to move in response to the movement of the latch, a first locking member movable between a locking and an unlocking position and cooperating with said first lock bar in such manner that said first locking member will prevent said latch from being moved more than a predetermined distance from its latching position toward its unlatching position unless said first locking member occupies its unlocking position, a second locking member movable between a locking and an unlocking position and cooperating with said second lock bar in such manner that said second locking member will prevent said latch from moving more than a predetermined distance from its unlatching toward its latching position unless said second locking member occupies its unlocking position, and a single electromagnet for moving both of said locking members from their locking to their unlocking positions.

6. An electric lock for a lever of a mechanical interlocking machine comprising a longitudinally movable lock bar assembly adapted for operative connection with the rocker arm of the machine lever, said lock bar assembly comprising two separate lock bars, a magnet, means controlled by said magnet and cooperating with one of said lock bars for preventing said lock bar assembly from moving away from either end of its stroke more than a predetermined distance unless said magnet is energized, and other means controlled by said magnet and cooperating with the other lock bar for preventing said lock bar assembly from being restored to either end of its stroke after it has been moved away from either end of its stroke more than said predetermined distance unless said magnet is energized.

7. An electric lock for a lever of a mechanical interlocking machine comprising a longitudinally movable lock bar assembly adapted for operative connection with the latch of the lever, said lock bar assembly comprising two separate lock bars, a first locking member movable between a locking and an unlocking position and cooperating with one of said locking bars to prevent said lock bar assembly from moving away from either end of its stroke more than a predetermined distance unless said first locking member is moved to its unlocking position, means associated with said one lock bar for mechanically moving said first locking member to its locking position adjacent each end of the stroke of said lock bar assembly, a second locking member movable between a locking and an unlocking position and cooperating with the other lock bar to prevent said locking bar assembly from being moved to either end of its stroke after it has been moved away from either end of its stroke more than said predetermined distance unless said second locking member is moved to its unlocking position, means associated with said other lock bar for mechanically moving said second locking member to its locking position at an intermediate point in the stroke of said lock bar assembly, and single electrically operated means for moving both said locking members from their locking to their unlocking positions.

8. An electric lock for a lever of a mechanical interlocking machine comprising a longitudinally movable lock bar assembly adapted for operative connection with the latch of the lever, said lock bar assembly comprising two separate lock bars, a first locking member movable between a locking and an unlocking position and cooperating with one of said locking bars to prevent said lock bar assembly from moving away from either end of its stroke more than a predetermined distance unless said first locking member is moved to its unlocking position, means associated with said one lock bar for mechanically moving said first locking member to its locking position adjacent each end of the stroke of said lock bar assembly, a second locking member movable between a locking and an unlocking position and cooperating with the other lock bar to prevent said lock bar assembly from being moved to either end of its stroke after it has been moved away from either end of its stroke more than said predetermined distance unless said second locking member is moved to its unlocking position, means associated with said other lock bar for mechanically moving said second locking member to its locking position at an intermediate point in the stroke of said lock bar assembly, and a single electromagnet for moving both said locking members from their locking to their unlocking positions.

9. An electric lock for a lever of a mechanical interlocking machine comprising a longitudinally movable lock bar assembly adapted for operative connection with the rocker link which is operated by the machine lever latch, said lock bar assembly comprising a first lock bar having a portion of its upper part cut away and provided at the bottom of said cut-away portion with a substantially centrally disposed locking dog having a recess formed on each side thereof, a first depressor plate secured to said first bar at the cut-away portion in this bar and provided on its under side with a recess having inclined ends which recess is somewhat longer than said dog, a first locking yoke movable between a locking position and an unlocking position, said first yoke being provided with a leg which extends into the slot formed between said first lock bar and said first depressor plate in such manner that when said first yoke occupies its locking position said leg will engage one side or the other of said dog and thus limit the movement of said locking bar assembly away from either extreme position unless said dog is moved to its unlocking position and that when said dog has been moved to its unlocking position and said lock bar is moved to one end of its stroke or the other the inclined ends of the recess in said first depressor plate will then cooperate with said leg to force said first locking yoke back to its locking position, a second lock bar forming part of said lock bar assembly and having its upper part cut away opposite the cut-away portion in said first bar and provided in the bottom of the cut-away portion with a recess the sides of which form two shoulders, a second depressor plate secured to said second lock bar at the cut-away portion in this bar and provided in its under surface with two recesses separated by a depressor wedge which is disposed above the recess in said second bar, a second locking yoke movable between a locking and an unlocking position and having a leg which extends into the slot formed between said second bar and said second depressor plate in such manner that when said second yoke occupies its locking position said leg will cooperate with one shoulder or the other of said second bar to prevent said lock bar assembly from being moved to either end of its stroke but that when said second yoke occupies its unlocking position said lock bar assembly will then be free to move to either end of its stroke and that when said second yoke has been moved to its unlocking position and said lock bar assembly is moved from either extreme position toward the other said depressor wedge will cooperate with the leg on said second yoke to force said second yoke to its locking position as the wedge passes the leg, and a single magnet for moving both said yokes from their locking to their unlocking positions.

WILLIAM C. McWHIRTER.